United States Patent
Rowe et al.

(10) Patent No.: US 9,421,497 B2
(45) Date of Patent: Aug. 23, 2016

(54) PROCESS AND DEVICE FOR SEPARATING ISOTOPES FROM A GAS FLOW

(75) Inventors: Bertrand Rowe, Saint Jacut de la Mer (FR); Robert Georges, Le Grand Fougeray (FR); André Canosa, Chantepie (FR); Sébastien Morales, Rennes (FR)

(73) Assignees: Universite De Rennes 1, Rennes (FR); Centre National De La Recherche Scientifique, Paris (FR)

( * ) Notice: Subject to any disclaimer, the term of this patent is extended or adjusted under 35 U.S.C. 154(b) by 338 days.

(21) Appl. No.: 14/123,499

(22) PCT Filed: May 31, 2012

(86) PCT No.: PCT/FR2012/051222
§ 371 (c)(1),
(2), (4) Date: May 23, 2014

(87) PCT Pub. No.: WO2012/164230
PCT Pub. Date: Dec. 6, 2012

(65) Prior Publication Data
US 2014/0245885 A1    Sep. 4, 2014

(30) Foreign Application Priority Data
Jun. 1, 2011 (FR) .................................. 11 54820

(51) Int. Cl.
B03C 1/00 (2006.01)
B01D 59/00 (2006.01)
(Continued)

(52) U.S. Cl.
CPC ................ B01D 59/00 (2013.01); B01D 45/04 (2013.01); B01D 45/12 (2013.01);
(Continued)

(58) Field of Classification Search
CPC ........ B01D 59/34; B01D 59/18; B01D 59/50; B01D 59/00; B01D 50/002; B01D 45/04; B01D 46/0031; B01D 45/12; B01J 19/121; B03C 1/30
See application file for complete search history.

(56) References Cited

U.S. PATENT DOCUMENTS 3,149,248 A * 9/1964 Valfells .................... G21D 7/02
                                                        310/11
3,558,877 A * 1/1971 Pressman ............... B01D 59/34
                                                        204/157.22
(Continued)

FOREIGN PATENT DOCUMENTS

| FR | 2 416 716 | 2/1979 |
| GB | 1545940 | 11/1975 |
| GB | 2 015 141 A | 2/1979 |

OTHER PUBLICATIONS

Bonnamy, A. et al, "*Infrared Spectroscopy of $(CO_2)_N$ Nanoparticles (30<N<14500) Flowing in a Uniform Supersonic Expansion*", J. of Chemical Physics, Feb. 22, 2003; 118(8); p. 3612-21.
(Continued)

*Primary Examiner* — Dung H Bui
(74) *Attorney, Agent, or Firm* — Gordon Rees Scully Mansukhani LLP

(57) ABSTRACT

A method for the isotopic separation of at least two different isotopes of a body in gaseous form by:
(a) converting into the form of a gas ($SF_6$, $UF_6$ or $MoF_6$) the body of interest containing the sought isotope;
(b) creating a flow of said gas at supersonic speed, of the laminar or slightly turbulent type;
(c) exciting the molecules by laser;
(d) inhibiting, by means of a laser, the nucleation of one of the isotopologs, thus forming less massive aggregates of said isotopolog than the aggregates formed by the molecules of the other isotopolog;
(e) ionizing the molecules and aggregates of said gas;
(f) submitting the ionized molecules and aggregates of molecules to an electromagnetic field to make the ionized molecules and aggregates of one of the isotopologs migrate towards the outside of the flow; and
(g) retrieving the part of the gas flow with the highest concentration in the sought isotope.

18 Claims, 3 Drawing Sheets

(51) Int. Cl.
*B01D 59/50* (2006.01)
*B01D 50/00* (2006.01)
*B01D 45/04* (2006.01)
*B01D 46/00* (2006.01)
*B01D 45/12* (2006.01)
*B01D 59/34* (2006.01)
*B01J 19/12* (2006.01)
*B03C 1/30* (2006.01)
*B01D 59/18* (2006.01)

(52) U.S. Cl.
CPC ......... *B01D 46/0031* (2013.01); *B01D 50/002* (2013.01); *B01D 59/34* (2013.01); *B01D 59/50* (2013.01); *B01D 59/18* (2013.01); *B01J 19/121* (2013.01); *B03C 1/30* (2013.01)

(56) References Cited

U.S. PATENT DOCUMENTS

| | | | | |
|---|---|---|---|---|
| 4,119,509 A | | 10/1978 | Szoke | |
| 4,269,659 A | * | 5/1981 | Goldberg | G21B 1/00 376/107 |
| 4,334,883 A | * | 6/1982 | Robinson | B01D 59/34 204/157.22 |
| 4,387,010 A | * | 6/1983 | McDonald | B01D 59/34 204/157.22 |
| 4,661,221 A | * | 4/1987 | Robinson | B01D 59/34 204/157.22 |
| 5,356,674 A | * | 10/1994 | Henne | C23C 4/128 427/189 |
| 5,360,611 A | * | 11/1994 | Robertson | A61K 9/0048 424/427 |
| 5,666,639 A | | 9/1997 | Eerkens et al. | |
| 5,883,350 A | * | 3/1999 | Eerkens | B01D 59/18 204/157.22 |
| 2010/0005763 A1 | * | 1/2010 | Bloom | B01D 45/12 55/315.1 |

OTHER PUBLICATIONS

Philippoz, J. M. et al, "*Infrared Vibrational Predissociation of van der Waals Clusters: Applications to Isotope Separation*", J. of Phys. Chem.; 1984; 88; p. 3936-38.

Parvin, P. et al, "*Molecular Laser Isotope Separation versus Atomic Vapor Laser Isotope Separation*", Progress in Nuclear Energy; 2004; 44(4); p. 331-45.

Takeuchi, K. et al, "*Growth of UF5 Nanoparticles Formed by Laser Photolysis in a Supersonic Nozzle Reactor*", J. of Aerosol Science, 1998; 29(8); p. 1027-33.

PCT International Search Report, Sep. 25, 2012.

\* cited by examiner

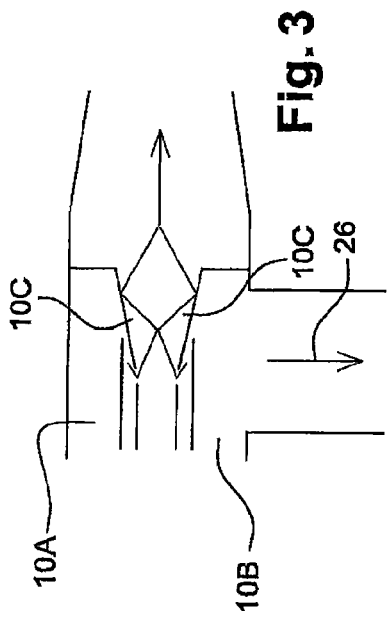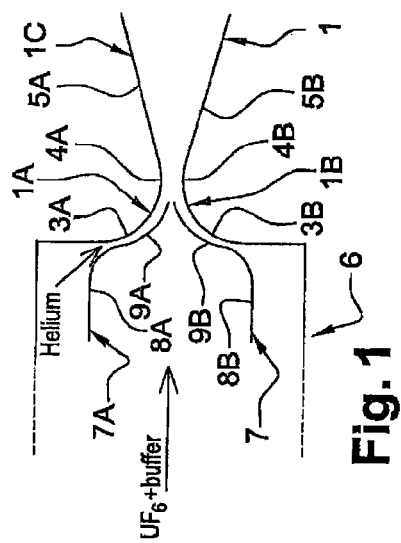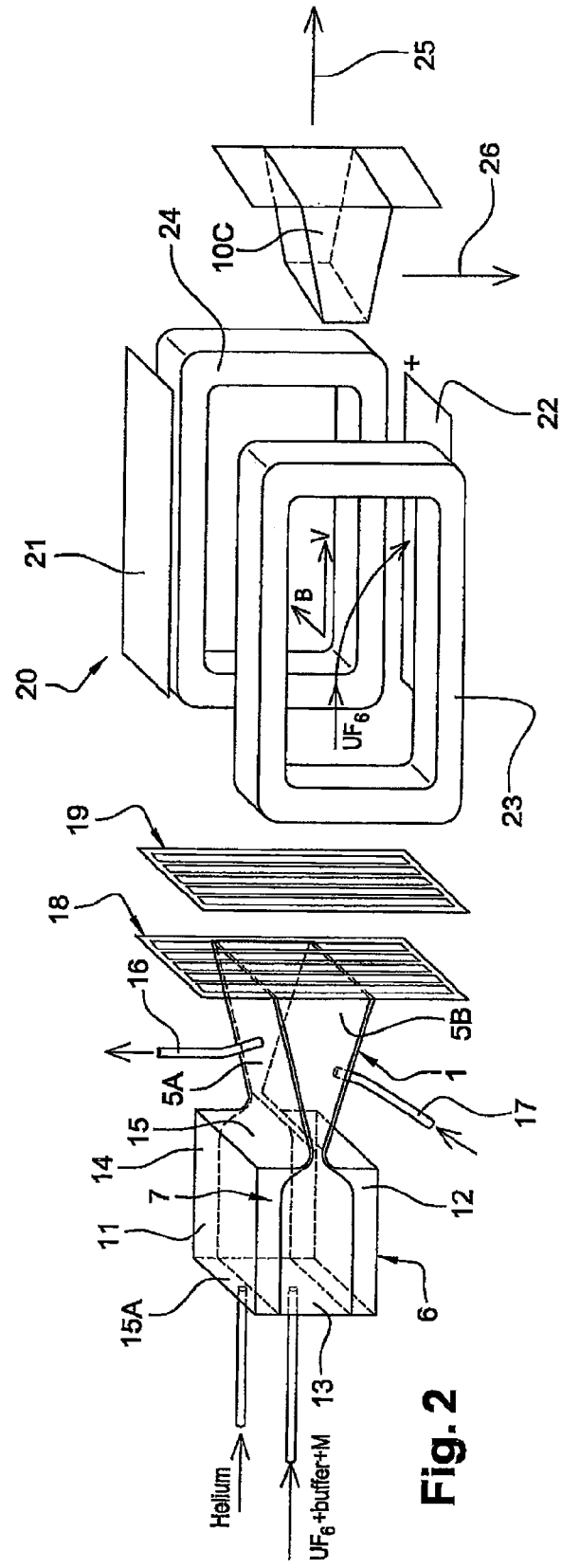

PROCESS AND DEVICE FOR SEPARATING ISOTOPES FROM A GAS FLOW

CROSS REFERENCE TO RELATED APPLICATIONS

This application claims priority from International Patent Application Number PCT/FR2012/051222 filed on May 21, 2012 which claims priority from French Patent Application No. 1154820 filed on Jun. 1, 2011.

BACKGROUND OF THE INVENTION

This invention relates to a method and device for implementing the said method, designed to separate, in a gaseous mixture, at least one isotopic compound from another or others contained in said mixture.

More particularly, the invention is aimed at separating stable isotopes of the same body, in order to isolate one of them for its properties and characteristics that make it attractive for the applications and uses envisaged.

There are several methods of separation, most of which are operational, based firstly on the conversion into gaseous form of the body, and secondly on the difference in atomic weights of the isotopes.

The invention relates to methods wherein the gas, possibly after mixing with another gas, namely an inert gas such as helium, argon or nitrogen, flows through a device designed to create a gaseous flow at supersonic speed which is subjected to means of excitation and chemical or physical modification such as lasers or electron beams that have a greater effect on the isotope sought than on the other or others. Then, the isotopes thus modified in gaseous form are, after ionisation, separated by electromagnetic means that make one of the isotopes migrate to the outside of the gaseous flow resulting in the enrichment of the sought isotope.

In general, the gaseous flow is generated by a nozzle, such as a so-called de Laval nozzle, for example, and the excitation and modification means are lasers or electron beams.

For example, the gaseous compound may be $SF_6$, $UF_6$, or $WF_6$, $MoF_6$. In the case of uranium the isotope sought is then $U^{235}$; in the case of sulphur, the isotope sought is S34 and in the case of molybdenum, the isotope sought is $Mo^{99}$.

Thus, the aim of these methods is to enrich with the sought isotope the external or internal part of the gaseous flow after separation.

The methods and devices for isotope separation need to reconcile contradictory constraints.

That is because they must simultaneously:
Consume as little power as possible
Be as small as possible
Make it possible to achieve enrichment rates (content of the isotope sought) that are as high as possible
Use quantities of gas, thus the starting body, that are as low as possible according to the final quantity of enriched product sought at a given enrichment rate.

The known methods and devices are still very far from optimising the work required for separating isotopic species. As a result of the low enrichment rates achieved in a single pass of gas in common devices such as centrifuges, the installations must be designed in a serial manner to obtain acceptable enrichment rates. That means that the installations have to be large, with high power consumption in relation to the minimum thermodynamic work required for enrichment. The patent FR 2 370 506 describes an example of such installations.

Other methods or devices, such as that described in the U.S. Pat. No. 4,119,509, lead to a flow regime that is not compatible with the efficient separation of isotopes. That is because the device does not inhibit diffusion, resulting in a mixture of isotopologues in the gaseous flows, greatly limiting the efficiency of the method.

The invention discloses a method and device that constitute a significant advance in the relevant field by allowing high-efficiency isotope separation with reasonable quantities of gas and power, using a small installation.

To that end, according to the invention, the method for the isotopic separation of at least two different isotopes of a body in gaseous form comprises the steps stated in claim 1.

The ion recovery step is preferably carried out with ion recombination.

The gas may, for example, be $SF_6$, $UF_6$ or $MoF_6$.

The molecules are excited by vibrations with the help of at least one laser, for example of the $CO_2$ type in the case of $UF_6$ gas.

The gas is mixed with at least one first inert gas, such as helium or argon.

The speed of the gaseous flow is supersonic.

Advantageously, the means to create the laminar or slightly turbulent flow is a nozzle, of the de Laval type, preferably with flat geometry comprising:
upstream walls that form a convergent;
a throat with a parallelepiped section at the exit of the upstream convergent;
a divergent conduit abutted to the throat, with a so-called exit section, wherein the exit corresponds to the flared part of the divergent conduit.

The nozzle is supplied with a gaseous flow that firstly comprises a central or inner jet formed of a mixture of gas to process and a first other gas, namely an inert gas, and secondly a peripheral or outer jet formed of a second other gas, namely an inert gas.

The two jets are substantially isolated from each other. In the case of a revolution nozzle, the two jets are concentric.

The first and second inert gases may be the same, and are selected from helium, nitrogen, argon and hydrogen.

The nozzle is supplied by means of a chamber supplied with gas, which has:
an exit wall corresponding to the upstream convergent of the nozzle
an internal deflector with convergent walls, substantially concentric with said upstream convergent of the nozzle, and at a distance from it.

The internal deflector is located upstream from the throat of the nozzle or extends downstream up to it.

A mixture of said gas and a first inert gas flows in the inner part of the deflector and a flow of a second inert gas is provided between the deflector and the convergent of the nozzle. These two gases are independent and come from two separate tanks.

After expansion in the divergent of the nozzle, part of the isotopes present are made to migrate from the inner flow to the outer flow.

The nozzle is generally planar in shape, so as to increase the efficiency of the process by minimising the mass flow of the species flowing in the boundary layers and maximising the mass flow of the species flowing in the isentropic core, where selective laser radiation absorption occurs.

The nozzle may for example have the following dimensions:
Curvature radius of the convergent of the nozzle: 260 mm
Curvature radius of the internal deflector: 250 mm
Height of throat: 100 mm Length of downstream divergent 2000 to 3000 mm
Width of the exit section of the divergent: 1200 mm The exit section of the internal deflector is positioned near the throat of the nozzle or offset by a few millimeters upstream from said throat.

These dimensions correspond to a speed of Mach 4, which itself corresponds to a temperature of 40° K. at the core of the flow. That allows satisfactory selectivity of laser radiation absorption and thus guarantees a high enrichment rate.

The width of the exit section of the conduit ranges between 5 and 20 times the width of the throat, and is preferably close to 7 times the width of the throat.

The length of the divergent conduit is at least 2000 mm and/or ranges between 20 and 30 times the height of the throat.

In the case of a revolution shape, the nozzle has the following dimensions as an example when it is of the revolution type:
Deflector curvature diameter: 250 mm
Curvature diameter of the internal deflector: 250 mm
Diameter of throat: 100 mm
Length of downstream divergent 1680 mm
Diameter of the exit section of the conduit: 340 mm The diameter of the exit section of the conduit ranges between 3 and 6 times the diameter of the throat, and is preferably between 3 and 4 times The length of the divergent conduit is at least 1300 mm and/or ranges between 13 and 30 times the diameter of the throat.

Whether the nozzle is planar or of the revolution type, the diffusion speed Vd is far smaller than the average speed Vq in the section in question of the nozzle Vd=D/e, where D is the diffusion coefficient and e is the distance that separates the walls opposite the external and internal deflectors.

Means to inhibit or reduce the phenomena of nucleation of molecules of the gaseous flow are provided in the conduit or in the flow outside the nozzle, and preferably, said means comprise at least one laser, for example of the infrared type, where the light direction is transversal to the gas flow.

Cooling means may be used in order to reduce the viscosity of the gas at the walls and thus the flow of the carrier inert gas. These cooling means allow gas flow temperatures between 4° K. and 80° K., preferably between 4° K. and 10° K.

The method is based on the uniformity of the flow at its core, which means that the pressure and temperature conditions remain unchanged in the direction of the flow over lengths of a few meters and transversally over several tens of centimeters. The shapes of the nozzles described make it possible to validate these conditions.

The invention will be better understood in the light of the description below relating to illustrative but non-limitative examples, by reference to the figures, wherein:

BRIEF DESCRIPTION OF THE DRAWINGS

FIG. 1 is a principle diagram of two elements of the device according to the invention, namely:
An upstream chamber supplied with two separate flows of gas, internal and external respectively, from two separate source tanks, and downstream from the chamber
A nozzle of the de Laval type;
FIG. 2 is a schematic perspective view of the whole device according to the invention;
FIG. 3 is a sectional diagram of the differential pumping means.

DETAILED DESCRIPTION OF THE DRAWINGS

Figure 4:
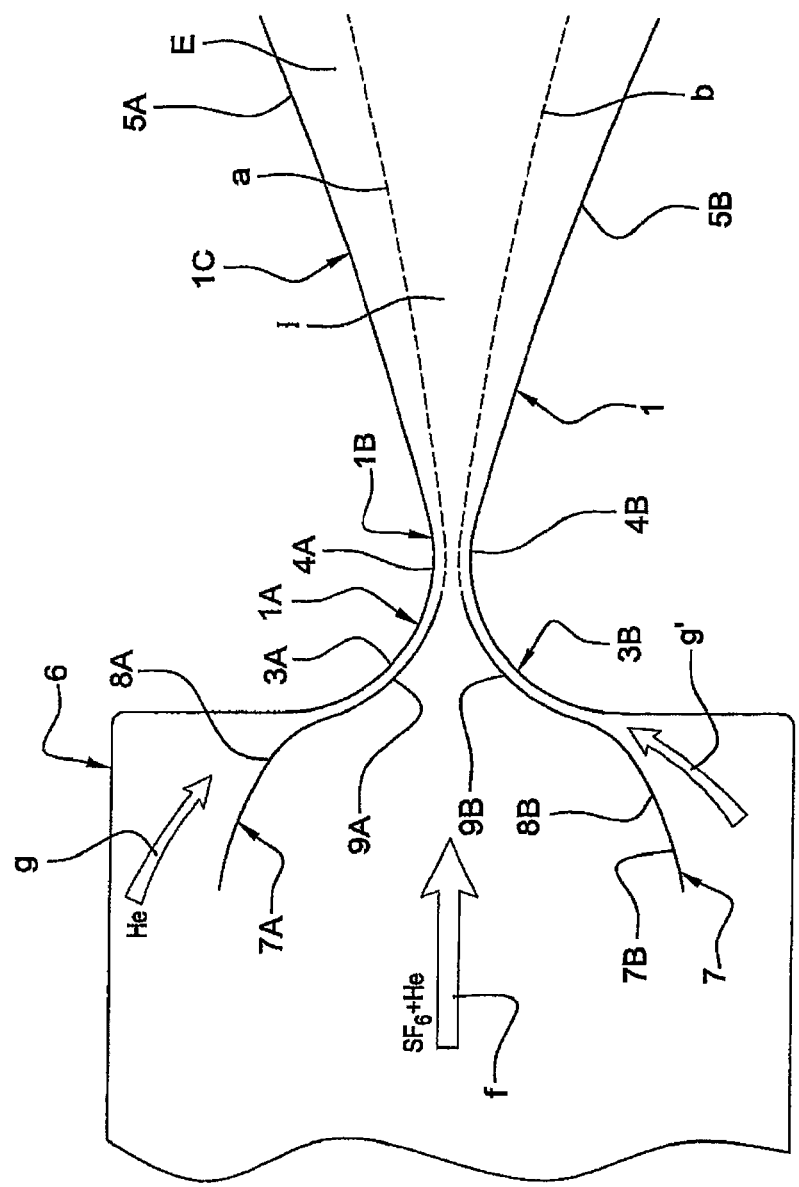
FIG. 4 is a sectional diagram of an example of nozzle.

FIG. 1 illustrates a schematic principle view of two elements of the device according to the invention, each corresponding to a step of the method in the invention.

The description below refers to a particular application, given on an illustrative but non-limitative basis, of the isotopic separation of two uranium isotopes, namely $U^{235}$ and $U^{238}$, from a gaseous compound of uranium, $UF_6$.

It is understood that the invention is not limited to such compounds and may be applied to another gaseous mixture, for example $SF_6$.

The device according to the invention as described below by reference to the figures is aimed at separating the two isotopes by isotope enrichment in order to use the isotope sought, such as $U^{235}$.

The ideas of 'upstream' and 'downstream' refer to the direction of flow of the moving gases, containing the isotope sought.

The device creates a flow of the gas at supersonic speed with the help of a device called a de Laval nozzle, reference 1, made up of a vessel with an increasing rectangular transverse section (transversal to the gas flow), the dimensions of which at the exit of the nozzle are for example: height between 500 mm and 1200 mm, preferably about 1000 mm, and width between 500 and 1200 mm, preferably about 1000 mm.

The nozzle 1 comprises an upstream supply section 1A, a central section 1B and a downstream section 1C.

The upstream section 1A comprises a convergent with a rounded section comprising a rounded upper plate 3A and a rounded lower plate 3B.

The central section 1B is made up of a throat formed of a parallel upper plate 4A and a parallel lower plate 4B.

The downstream section 1C of the nozzle comprises an upper planar plate 5A and a lower planar plate 5B forming a divergent.

It is understood that the upstream section 1A, the central section 1B and the downstream section 1C also each comprise vertical walls on the sides, which are not visible in the schematic section of FIG. 1.

A device 6 is provided upstream from the nozzle 1 to supply the nozzle with the gas to be processed, particularly in a way as to generate a gas mixture jet with particular characteristics in the nozzle 1.

The supply device comprises a chamber 6, which is a parallelepiped for example, with an exit opening made up of the convergent with a rounded section 3A, 3B of the upstream section 1A of the nozzle 1.

Inside the chamber 6, a deflector 7 is provided, formed of an upper curved plate 7A and a lower curved plate 7B respectively.

Each deflector plate 7A, 7B successively comprises:
a convergent upstream part, formed of two plates, an upper plate 8A and a lower plate 8B respectively
a divergent downstream part, formed of two plates, an upper plate 9A and a lower plate 9B respectively.

The convergent plates 8A, 8B have curvatures that are very close or similar to those of upstream plates 3A and 3B, which form both the entry of the nozzle 1 and the exit of the chamber 6. The distance between the plates 8A, 8B from the plates 3A, 3B is preferably constant. The plates are welded edge-to-edge. Details are given below by reference to FIG. 4. Each plate has a curved shape with a curvature point corresponding to the join between the upstream part and the downstream part.

The chamber 6 is supplied with:
- firstly, the gas to process, such as $UF_6$, mixed with a first other gas or buffer gas such as helium or hydrogen for example, in the inner space of the deflector 7;
- secondly a second other gas such as helium, in the space between the respective walls of the deflector and the chamber;

These two gaseous flows come from separate source tanks (not represented and known in themselves) and the deflectors 7A and 7B are designed so that said gases do not mix with each other before the throat of the nozzle.

All the gases from the chamber 6 enter the nozzle 1 by the throat 4A, 4B.

The gas jet from the nozzle 1 enters a downstream expansion chamber (not represented in FIGS. 1 and 2 and visible in FIG. 3). In that expansion chamber, the gas jet is subjected to excitation means (by laser) and ionisation means (by laser); said means of excitation are not represented in FIG. 1 and are represented in FIG. 2.

Then, the gaseous flow goes through a magnetic deviation device (not represented and described by reference to FIG. 2), to deviate the molecules of the gas sought such as for example $U^{235}$ and enrich the centre of the flow with gas molecules of no value or of less value.

FIG. 2 is a perspective representation of the whole device according to the invention for implementing the method, in schematic form, containing some of the elements of FIG. 1.

The chamber 6 and the deflector 7 are aimed at generating a flow at supersonic speed in the nozzle, in the form of a central jet, in a planar or revolutionary shape depending on the geometry of the nozzle, surrounded by a so-called peripheral annular jet, as described below.

The chamber 6 is schematically represented by a cube comprising an upper wall 11, a lower wall 12, side walls 13 and 14, a front wall 15 (downstream) and a rear wall 15A (upstream).

In a preferred embodiment, the divergent walls 5A and 5B of the nozzle are cooled by cryogenics, using means known in themselves such as conduits 16 and 17 connected to fluid circulation circuitry and opening into the walls 5A, 5B, wherein the source of cryogenic fluid is not represented and is known in itself.

Devices are provided at the exit of the nozzle 1 that are designed to excite the particles of the gaseous mixture leaving the nozzle. These means are for example infrared type lasers that are known in themselves and referenced 18.

After the excitation step, the gas flow passes through ionisation means 19 made up of electron beams or excimer lasers, that is to say a laser using a gas mixed with a halogen. Under the effect of electronic stimulation, an excimer is formed, which upon returning to its fundamental state emits laser radiation with a determined wavelength. This type of laser currently makes it possible to reach wavelengths below 200 nm in vacuum ultraviolet.

After that, the gas flow enters an isotope separation assembly 20 based on the forced diffusion properties under the effect of electromagnetic fields of the compounds of the gaseous mixture.

The magnetic separation device 20 comprises two rectangular plates 21 and 22 with "−" and "+" polarities respectively, parallel to the direction of the gas flow, and two superconducting magnets 23 and 24 with annular shapes that are known in themselves and located on either side of the jet, along two parallel planes transversal to the polarised plates 21 and 22.

At the exit of the magnetic separation device 20, a device 10 is provided for so-called 'differential pumping' diffusion, connected downstream to pumps (known in themselves and not represented) by the flow arrow 25.

The device 10 is described by reference to FIG. 3 and comprises two separate pumping conduits 10A and 10B and a central diffuser 10C. The task of the central diffuser is to allow the recompression of the gas flow and thus the use of a pump of a smaller size. The so-called differential pumping is created by different pumps downstream from the flow arrows 25 and 26, which makes it possible to effectively maintain the low pressure required for the proper quality of flow at supersonic speed. Pumping downstream from the flow arrow 26 takes in the surplus flow in the boundary layers of the flow outside the diffuser 10C.

FIG. 4 shows the nozzle and its upstream chamber 6 schematically and on a larger scale. The elements shared with the representation of FIG. 1 bear the same references.

In the chamber 6, the arrow "f" represents the flow direction of the internal mixture SF6 and the buffer gas (He). The arrows "g" and "g'" represent the external flow of helium.

The shape of the nozzle and its dimensions are calculated on the basis of the following elements and parameters: temperature, pressure, nature and proportion of mixed gases (in the introduction part of the upstream chamber 6 of the nozzle, for example $SF_6$ plus buffer gas).

Figure 5:
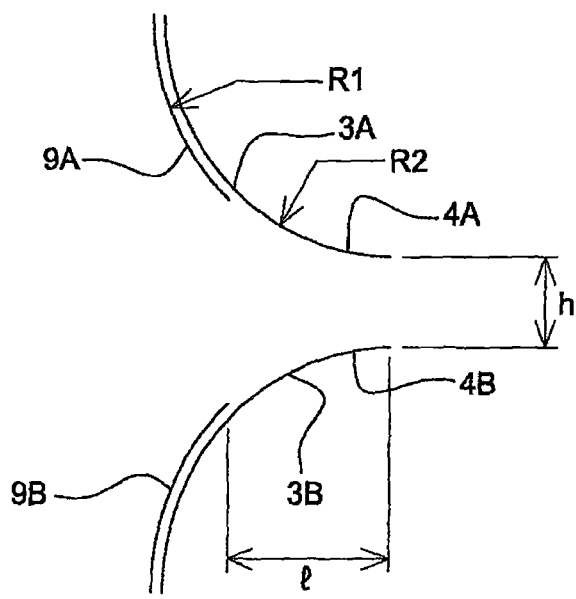
FIG. 5 is a partial schematic section in a vertical plane of the upstream part of the nozzle and the deflectors.

FIG. 5 gives a particular non-limitative example of the dimensions of the nozzle.

The upstream convergent deflecting walls 9A and 9B have a curvature radius R1 of 26 mm, whereas the upstream convergent walls 4A and 4B of the nozzle have a curvature radius R2 of 25 mm. The throat 4A, 4B of the nozzle has a height dimension "h" transversal to the flow of about 10 mm.

The distance separating the convergent deflecting plates 9A, 9B from the convergent 3A, 3B of the nozzle 1 is as small as possible, about h/10, all other parameters being equal. Lastly, the distance "I" along the flow direction between the downstream end of the deflecting plates 9A and 9B on the one hand and the start of the throat 3A, 3B on the other hand is for example 18 mm.

As an alternative (not illustrated), the nozzle and the upstream deflector (in the chamber 6) may be made in the form of a revolution body (for example a conical body) where the centre line corresponds to the direction of the gas flow.

The nozzle has a shape and dimensions that are such:
  that the speed of the flow downstream from the throat is greater than Mach 2, and preferably about Mach 3 or 4; and
  there is no diffusion from the outer flow "E" to the inner flow "I" in the nozzle, between the divergent walls 5A, 5B, the two flows being demarcated by a lower and an upper surface symbolised in dotted lines "a" and "b" in FIG. 4.

The total flow of the peripheral gas (helium) outside the two deflecting walls 9A and 9B and the gas mixture to process with the buffer gas is distributed, at the downstream exit of the nozzle, that is to say at the ends of the divergent plates 5A, 5B so that:
  central flow rate=total flow rate×0.85
  flow rate of outer annular part of the flow=total flow rate× 0.15 approximately Cooling by cryogenics of the walls of the divergent 5A, 5B of the nozzle, with liquid helium, for example, makes it possible to reduce and diminish very substantially the mass flows of the processed gas flow.

The properties of the inner flow "I" around the central line of the nozzle are such that there is no diffusion between the outer flow "E" and said inner flow "I" and that the viscosity of the flow is negligible. The Reynolds number is high, that is greater than 2000. It is known that if the diffusion coefficient is of the order of magnitude of the kinematic viscosity, which is the case with many gases, it provides the order of magnitude of the speed of the whole in relation to the diffusion speed. A large Reynolds number thus implies negligible diffusion.

The aim is to ensure that the sought isotopologues are removed to the outer flow, thanks at least in part to forced diffusion, the scale of which depends greatly on the mass, under an electromagnetic field of the particles after ionisation by the ionisation means 19 (FIG. 2).

One of the merits and one of the particularities of the invention is to use aggregate ions for separation, because the ions can easily acquire an overall average speed under the effect of an electromagnetic field that is of the same order of magnitude as the average speed of the flow for a specified mass.

The method according to the invention uses the mass distribution of aggregates before ionisation and those aggregates are then separated after ionisation.

The shape and dimensions of the walls of the separator are calculated on the basis of the current lines, so that the separators follow the current lines.

According to one particularity of the method in the invention, natural molecular diffusion inside the jet, between parallel current lines, is considered to be negligible.

The complete ionisation device comprises two types of source:
- an infrared IR laser designed to excite one of the two isotopologues, in this case $32SF_6$ or $34SF_6$, and create, by selective inhibition of nucleation, aggregate populations with well differentiated average masses. The density of the gas to excite is about 10-14/cm3.
- Electron beams or excimer lasers designed for primary ionisation (non-selective).

The IR laser inhibits the nucleation of the excited species to a few %.

Nucleation leads to an increase in the effective ionisation section of the aggregates and a reduction of their volume concentration.

The isotopologue $34SF_6$ is excited and is thus less aggregated than the other isotopologue ($32SF_6$). The monomers and small aggregates of $34SF_6$, which are far lighter, are thus more strongly deviated after they are ionised by the electromagnetic means placed downstream as a result of their lower mass.

$32SF_6$ is statistically more aggregated, and thus has aggregates with a greater mass than the isotopologue $34SF_6$. As a result, the downstream electromagnetic field has a much smaller influence on $32SF_6$. It would therefore not "leave the jet" as much.

Note that the excitation IR laser is not strictly necessary as nucleation at its outset leads to 'natural' enrichment of the least abundant isotopologue but is provided in a preferred form of implementation of the invention. The merit of the IR laser is to increase the mass differentiation between $34SF_6$ and $32SF_6$ by inhibiting the aggregation of monomers.

Figure 6:
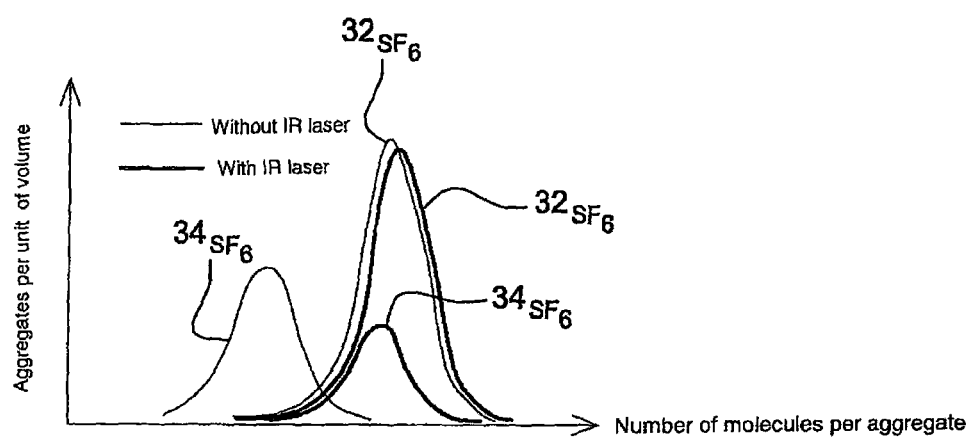
FIG. 6 is a curve that schematically illustrates the variations in the concentration of aggregates depending on the number of molecules in the aggregates, with and without infrared laser, obtained downstream from the laser beam.

FIG. 6 is a curve that schematically illustrates the variations in the concentration of aggregates depending on the number of molecules in the aggregates, with and without infrared laser, obtained downstream from the laser beam. In this figure, it can be seen that the formation of aggregates of $32SF_6$ is virtually not inhibited, when it is strongly inhibited with $34SF_6$. The aim is that the size of the aggregates of $34SF_6$, linked directly to the number of molecules N per aggregate, should allow them to leave the jet under the effect of the electromagnetic field.

Ionisation may be achieved in two ways:
1. either in the so-called 'direct' way, that is to say by a laser that creates cations and electrons, by the reaction: photons+ aggregate→aggregate ionised into cations+electrons; this leads to the creation of positively ionised aggregates;
2. or in two successive ionisation stages, by laser or electron beam or electrical discharge, to create negatively ionised aggregates (anions), namely:
    'primary ionisation', which creates for example, by the reaction: atom+electron→a positive ion+electron;
    followed by 'secondary ionisation' wherein the aggregates are ionised in negative form (anions) by electron attachment of the electrons formed by primary ionisation.

The second way above (2) is preferred.

The invention claimed is:

1. A method for isotopic separation of at least two different isotopes of a gaseous mixture comprising the steps of:
   providing a laminar or slightly turbulent flow of a gaseous mixture travelling at supersonic speed comprising:
       an isotope of interest in a first aggregate of isotopes, and
       one or more different isotopes, wherein each of the one or more different isotopes is comprised in one or more additional aggregates of isotopes;
   contacting the gaseous mixture with a laser beam causing one or more isotopes of the gaseous mixture to be excited;
   inhibiting the nucleation of the isotope of interest using the laser beam to form a first aggregate of isotopes that is smaller than the one or more additional aggregates of isotopes;
   ionizing the isotopes to create ionized isotopes, including the first and additional aggregates of isotopes of the gaseous mixture;
   submitting the ionized isotopes and the first and additional aggregates of isotopes to an electromagnetic field causing the ionized isotopes and the first and additional aggregates of isotopes to migrate towards an outside portion of the flow based on a difference in mass between the respective aggregates of the first and additional aggregates of isotopes; and
   retrieving a part of the gas flow with the highest concentration of the isotope of interest,
   wherein the laminar or slightly turbulent flow is provided by a de Laval nozzle having a flat geometry, comprising:
       (a) an upstream external wall shaped as a convergent with an entry corresponding to a flared part of the convergent, wherein the upstream external wall comprises a section in an arc;
       (b) a parallelepiped throat at an exit of the upstream external wall; and
       (c) a downstream conduit adjacent to or contiguous with the parallelepiped throat,
   wherein an exit section of the downstream conduit comprises flared out walls, and wherein the nozzle is supplied with a gaseous flow from a chamber, the chamber comprising:
(a) an exit wall corresponding to the upstream external wall of the nozzle; and
(b) an internal convergent deflector that is substantially concentric with the upstream external wall of the nozzle and positioned at a predetermined distance from the upstream external wall.

2. A method according to claim 1, wherein the gaseous mixture comprises $SF_6$, UF6 or $MoF_6$.

3. A method according to claim 1, wherein the laser beam comprises an excimer laser, and the gaseous mixture comprises a $UF_6$ gas.

4. A method according to claim 1, wherein the gaseous mixture is mixed with at least one first inert gas, comprising helium, argon or hydrogen prior to contacting the gaseous mixture with the laser beam.

5. A method according to claim 1, wherein the central jet and the peripheral jet are substantially separated from each other and are concentric with each other, wherein the first and second inert gases are the same and are selected from helium, nitrogen, argon and hydrogen.

6. A method according to claim 1, wherein the internal convergent deflector is located upstream from the parallelepiped throat of the nozzle or extends downstream up to the parallelepiped throat of the nozzle.

7. A method according to claim 1, wherein the central jet flows in an inner part of the internal convergent deflector and the peripheral jet is arranged between the internal convergent deflector and the upstream external wall.

8. A method according to claim 1, wherein a downstream open section of the internal convergent deflector is located upstream from the parallelepiped throat or extends downstream up to the parallelepiped throat.

9. A method according to claim 1, wherein the central jet flows in an inner part of the internal deflector and the peripheral jet is provided between the upstream external wall and the internal convergent deflector.

10. A device for implementing the method according to claim 1, wherein a width of the exit section of the downstream conduit ranges between 5 and 20 times a width of the parallelepiped throat, and a length of the downstream conduit is at least 2000 mm or ranges between 20 and 30 times the width of the parallelepiped throat.

11. A device for implementing the method according to claim 1, wherein the device comprises:
(a) a curvature diameter of the upstream internal wall being 250 mm;
(b) a curvature diameter of the internal convergent deflector being 250 mm;
(c) a diameter of the parallelepiped throat being 100 mm;
(d) a length of the downstream conduit being 1680 mm; and
(e) a diameter of the exit section of the downstream conduit being 340 mm.

12. A device for implementing the method according to claim 1, wherein a diameter of the exit section of the downstream conduit ranges between 3 and 6 times a diameter of the parallelepiped throat, and a length of the downstream conduit is at least 1300 mm or ranges between 13 and 30 times the diameter of the parallelepiped throat.

13. A method according to claim 1, wherein the nozzle is supplied with a gaseous flow that comprises:
(a) a central jet formed of a gas mixture comprising the isotope of interest and the one or more different isotopes and a second gas comprising a first inert gas, and
(b) a peripheral jet formed of a second inert gas,
wherein the gasses of (a) and (b) are each supplied by a different source tank.

14. A method according to claim 13, wherein the isotopes migrate from the central jet to the peripheral jet.

15. A device for implementing the method according to claim 1, wherein the device comprises:
(a) a curvature radius of the upstream internal wall being 260 mm;
(b) a curvature radius of the internal convergent deflector being 250 mm;
(c) a width of the parallelepiped throat being 100 mm;
(d) a length of the downstream conduit ranging between 2000 to 3000 mm; and
(e) a width of the exit section of the downstream conduit being 1200 mm.

16. A device according to claim 15, wherein a diffusion speed of the flow into the nozzle is less than an average speed in a section of the nozzle.

17. A device according to claim 15, wherein the laser beam is provided by at least one infrared laser, wherein a light direction of the laser beam is provided transversal to a direction provided for the laminar or slightly turbulent flow of gas in the device.

18. A device according to claim 15, wherein the nozzle is cryogenically cooled.

* * * * *